United States Patent [19]

Kubo et al.

[11] Patent Number: 4,866,553
[45] Date of Patent: Sep. 12, 1989

[54] MAGNETIC DISK APPARATUS HAVING A STRUCTURE SUITABLE FOR MEASURING A MINUTE FLYING WEIGHT

[75] Inventors: Masahiro Kubo; Yasuo Ohtsubo, both of Yokohama, Japan

[73] Assignee: Kabushiki Kaisha Toshiba, Kawasaki, Japan

[21] Appl. No.: 212,108

[22] Filed: Jun. 28, 1988

Related U.S. Application Data

[63] Continuation of Ser. No. 885,448, Jul. 14, 1986, abandoned.

[30] Foreign Application Priority Data

Jul. 19, 1985 [JP] Japan .................................. 60-159350

[51] Int. Cl.⁴ .............................................. G11B 5/60
[52] U.S. Cl. ..................................... 360/103; 360/109
[58] Field of Search ........ 360/103, 102, 104, 109–110, 360/122, 128–129, 86, 97.01, 99.01; 369/55

[56] References Cited

U.S. PATENT DOCUMENTS

| | | | |
|---|---|---|---|
| 3,695,767 | 10/1972 | George et al. | 360/103 X |
| 3,855,625 | 12/1974 | Garnier et al. | 360/103 |
| 4,081,846 | 3/1978 | Roscamp et al. | 360/103 |
| 4,475,135 | 10/1984 | Warner et al. | 360/103 |
| 4,651,248 | 3/1987 | Shiiki et al. | 360/122 X |
| 4,673,996 | 6/1987 | White | 360/103 |

FOREIGN PATENT DOCUMENTS

| | | | |
|---|---|---|---|
| 53-39111 | 10/1978 | Japan | 360/103 |
| 55-122265 | 9/1980 | Japan | 360/103 |
| 55-150124 | 11/1980 | Japan | 360/103 |
| 60-18870 | 1/1985 | Japan | 360/103 |
| 60-50404 | 3/1985 | Japan . | |
| 60-246068 | 12/1985 | Japan | 360/103 |

OTHER PUBLICATIONS

Lin, "Techniques for the Measurement of Air-Bearing Separation-A Review", IEEE Transactions on Magnetics, vol. Mag. 9, No. 4, Dec. 1973.
IBM Technical Disclosure Bulletin, vol. 26, No. 9, Feb. 1984, pp. 4822-4823, Armonk, New York, U.S., W. Jaerisch et al., "Interferometric thickness measurement of very thin air gaps or films".
IBM Technical Disclosure Bulletin, vol. 24, No. 7A, Dec. 1981, p. 3174, Armonk, New York, U.S.; N.A. Feliss: "Measurement of Flying Height".

Primary Examiner—John H. Wolfe
Attorney, Agent, or Firm—Oblon, Spivak, McClelland, Maier & Neustadt

[57] ABSTRACT

In a magnetic disk apparatus according to the present invention, a slider has a sliding surface and a reflecting surface. The height of the reflecting surface from the magnetic disk is greater than that of the sliding surface from the disk, when the slider flies above the disk, so that there exists a minute difference in level between the sliding surface and the reflecting surface. The flying height of the sliding surface of the slider from the magnetic disk is measured. When the magnetic disk is rotated, the slider flies from the disk. In this state, a reference flying height, i.e., the flying height of the reflecting surface from the magnetic disk is measured by the optical interference process. Then, the minute difference is substracted from the measured reference flying height to obtain the flying height of the sliding surface of the slider from the magnetic disk. According to the invention, even if the minimum flying height of the sliding surface of the slider is shorter than 0.1 micrometer, the measurement can be effected by the optical interference process. In general, moreover, a minute flying height between a fixed datum plane and an object flying above the datum plane can be measured accurately.

21 Claims, 10 Drawing Sheets

LENGTH OF SLIDER IN
ROTATING DIRECTION
OF MAGNETIC DISK

MAGNETIC DISK APPARATUS HAVING A STRUCTURE SUITABLE FOR MEASURING A MINUTE FLYING WEIGHT

BACKGROUND OF THE INVENTION

The present invention relates to a method of accurately measuring, for example, a very small flying height of a slider of a magnetic disk apparatus from a magnetic disk, and to a magnetic disk apparatus adapted to be used for the measurement of the minute flying height of the slider from the magnetic disk.

Magnetic disk apparatuses are generally known as a typical example of external memory units of computers. In these apparatuses, a magnetic disk is coupled to a motor for rotation, and a slider is provided for movement above the disk. A magnetic head fixed to the slider moves together with the slider above the magnetic disk, whereby information is written in or read out of the disk.

In the conventional magnetic disk apparatuses of this type, the magnetic head and slider must be kept from being in contact with the magnetic disk so that they fly at a substantially fixed, minute height from the disk. This is required because the disk will be damaged if touched by the magnetic head. If the head fails to be kept flying a minute height above the disk, moreover, errors may possibly occur while the information is being written in or read out of the disk. Described in Japanese Patent Disclosure No. 64670/83, for example, is an apparatus in which a magnetic head and a slider are kept off a magnetic disk, flying at a substantially fixed, minute height from the disk. In this prior art apparatus, compressed air flows between the magnetic disk and the slider facing the same while the disk is rotating. An air bearing force caused by the compressed air flow acts as a dynamic lift on the slider, thereby flying the slider from the magnetic disk. At the same time, the slider is urged to be depressed toward the disk. When the force of depression balances with the dynamic lift, the head and slider fly and keep at the minute height from the disk.

Recently a recording system has been developed which can record information with high recording density. In this system, for example, magnetic domains of a magnetic disk with a perpendicular magnetic recording medium are perpendicularly magnetized so that the information is recorded on the disk. For high-density information recording on the recording system of this type, a magnetic head must be kept at a flying height of 0.1 micrometer or less from the magnetic disk, and variation of the flying height must be restricted to a very small value.

During manufacturing processes for the magnetic disk apparatuses, therefore, the flying height of the magnetic head or slider from the magnetic disk, which is very small, may sometimes suffer errors due to slight errors in assembly or slight difference in the shape of each manufactured slider. Thus, in manufacturing the magnetic disk apparatuses, the slider must be checked to see if its flying height is within a predetermined range.

Since the flying height of the slider is as small as 0.1 micrometer or less, however, it cannot easily be measured by conventional methods. The optical interference process is among the methods of measuring a minute height. However, a distance shorter than 0.1 micrometer cannot be measured directly by this process. In consequence, it is difficult to apply the optical interference process for the measurement of the flying height of the slider.

Thus, it is difficult to manufacture magnetic disk apparatuses in which the distance between the magnetic disk in rotation and the slider flying above the disk is a fixed value less than 0.1 micrometer.

SUMMARY OF THE INVENTION

An object of the present invention is to provide a method of accurately measuring a minute flying height between a fixed datum plane and an object flying above the datum plane.

Another object of the invention is to provide a method of accurately measuring the flying height of a slider of a magnetic disk apparatus from a magnetic disk at the time of assembling the magnetic disk apparatus.

Still another object of the invention is to facilitate inspection of products by a method of measurement for magnetic disk apparatuses, and manufacture magnetic disk apparatuses in which the flying height of a slider is predetermined.

A further object of the invention is to provide a magnetic disk apparatus adapted for the measurement of a minute flying height of a slider from a magnetic disk.

According to the present invention, there is provided a magnetic disk apparatus in which a slider has a sliding surface and a reflecting surface. The height of the reflecting surface from the magnetic disk is greater than that of the sliding surface from the disk, when the slider flies above the disk, so that there exists a minute difference in level between the sliding surface and the reflecting surface, whereby the flying height of the sliding surface of the slider from the magnetic disk is measured. When the magnetic disk is rotated, the slider flies from the disk. In this state, a reference flying height, i.e., the flying height of the reflecting surface from the magnetic disk, is measured by the optical interference process. Then, the minute difference is subtracted from the measured reference flying height to obtain the flying height of the sliding surface of the slider from the magnetic disk. In general, moreover, a minute flying height between a fixed datum plane and an object flying above the datum plane can be measured accurately.

DETAILED DESCRIPTION OF THE PREFERRED EMBODIMENTS

Figure 1:
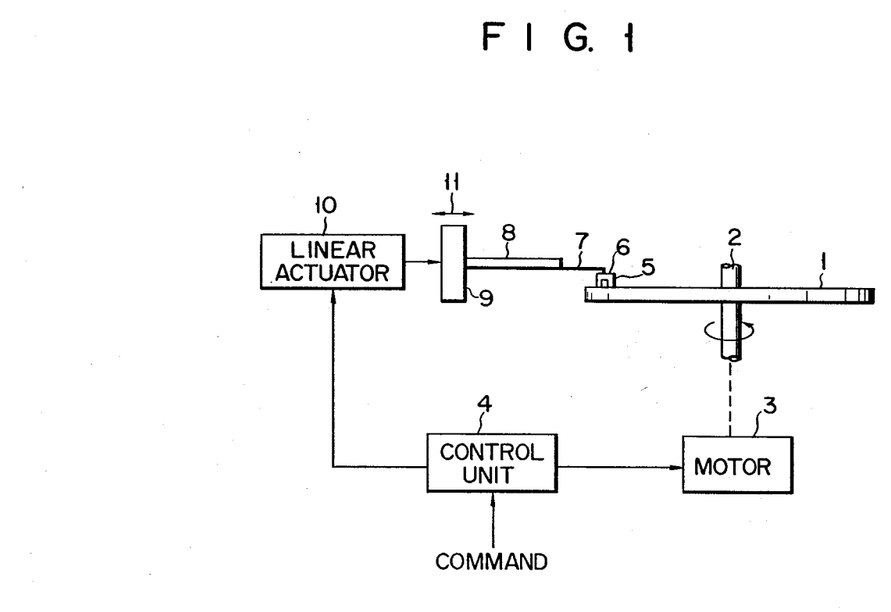
FIG. 1 is a block diagram showing a magnetic disk apparatus.

In FIG. 1, showing a magnetic disk apparatus, numeral 1 designates a magnetic disk which comprises a substrate and a recording layer formed of a vertical magnetic recording medium on the substrate. Disk 1 is rigidly mounted on a turntable (not shown) fixed on shaft 2 which is coupled to motor 3. Thus, the disk can rotate together with shaft 2.

Magnetic head 5, which is fixed to slider 6, is placed on magnetic disk 1. Slider 6 is supported by suspension mechanism 7 in a manner such that it can fly from disk 1 as the disk rotates. Mechanism 7 is coupled to carriage 9 by means of access arm 8. Carriage 9 is connected to linear actuator 10 so as to be movable in the radial direction of disk 1, as indicated by arrow 11. Motor 3 and actuator 10 are electrically connected to control unit 4 to which commands are applied from a keyboard (not shown). Thus, the motor and actuator are controlled by control signals delivered from unit 4.

Figure 2:
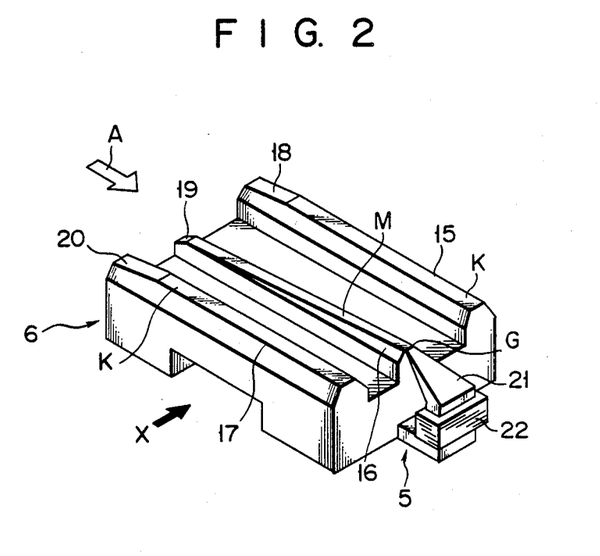
FIG. 2 is a perspective view showing an example of a slider of the magnetic disk apparatus shown in FIG. 1.
Figure 3:
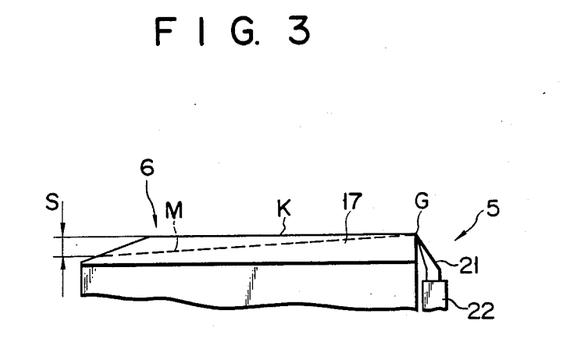
FIG. 3 is a partial side view of the slider as taken in the direction of arrow X of FIG. 2.

As shown in FIGS. 2 and 3, three ridges 15, 16 and 17 are formed on that face of slider 6 opposed to magnetic disk 1, extending in the rotating direction of the disk as indicated by arrow A. Slanting surfaces 18, 19 and 20 are formed on the end edges of ridges 15, 16 and 17, respectively, on the upstream side thereof with respect to the rotating direction of disk 1. Sliding surfaces K of ridges 15 and 17 facing the magnetic disk are specularly polished. Reflecting surface M of ridge 16 facing the disk is provided on a slant so that fine difference s in the level is provided between surfaces K and M. Preferably, the maximum value of difference s ranges from 0.1 to 2 micrometers, since a distance shorter than 0.1 micrometer cannot be measured by the optical interference process.

Magnetic head 5 includes yoke 21 attached to that end edge of reflecting surface M on the downstream side with respect to the rotating direction of magnetic disk 1, and coil 22 wound around the yoke. The tip end of yoke 21 is located substantially flush with the end edge of surface M so that transducing gap G is formed between yoke 21 and the edge. Thus, the respective end edges of sliding surfaces K and reflecting surface M on the downstream side and the tip end of yoke 21 of the magnetic head are all on the same plane.

According to the apparatus described above, sliding surfaces K of slider 6 are in contact with magnetic disk 1 when the disk is at a standstill, and fly from the disk when the disk rotates. More specifically, when disk 1 rotates, a flow of compressed air is produced between the disk and sliding surfaces K of slider 6. An air bearing force caused by the compressed air flow acts as a dynamic lift on slider 6, thus flying the slider from disk 1. The higher the rotational frequency of disk 1, therefore, the greater the dynamic lift and the flying height of slider 6 will be. A spring or the like urges slider 6 to be depressed toward magnetic disk 1. As the force of depression matches the dynamic lift, sliding surfaces K of slider 6 flies at a substantially fixed, minute distance from disk 1. When slider 6 flies, surfaces K decline to the downstream side with respect to the rotating direction of disk 1, due to aerodynamics.

If magnetic disk 1 is a perpendicular magnetic disk, in particular, the distance between the disk and magnetic head 5, i.e., the minimum flying height of sliding surfaces K of slider 6, is expected to be kept within 0.1 micrometer and subject to only very small variation.

Magnetic disk apparatuses, as products, must be checked to see if the flying height is a predetermined value. This check is achieved by the optical interference process using measuring apparatus 31, which will be described below.

Figure 4:
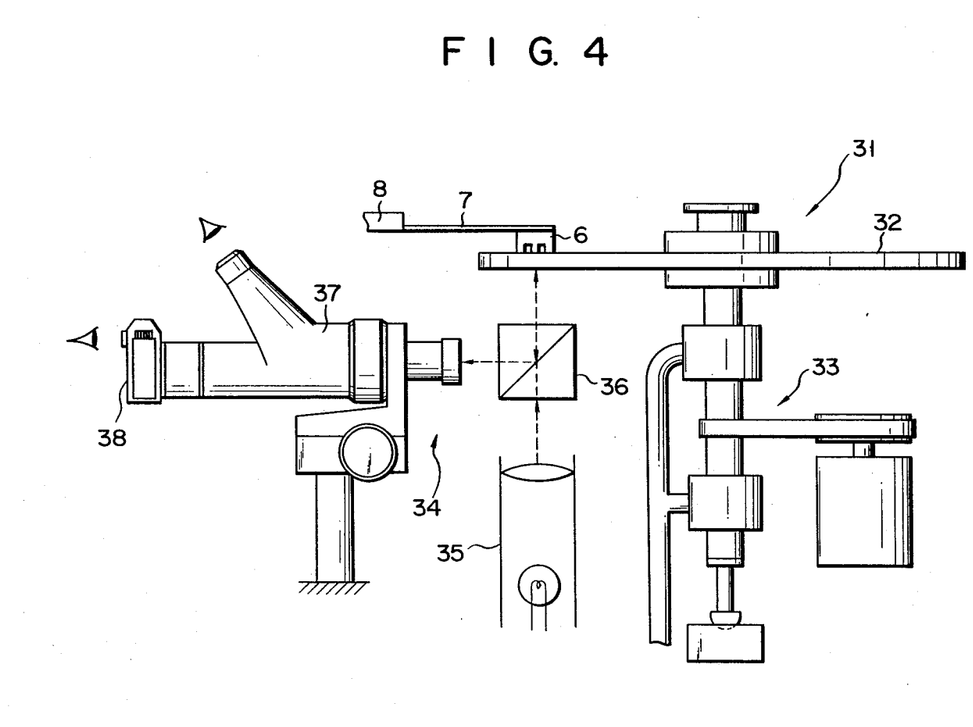
FIG. 4 is a block diagram showing a measuring apparatus according to an example of the present invention for effecting a method of measurement of the invention.

As shown in FIG. 4, measuring apparatus 31 comprises measuring magnetic disk 32 made of transparent material, motor 33 for rotating disk 32, and optical interferometer 34. The interferometer includes light source unit 35 for applying a unicolor or white light beam to slider 6, beam splitter 36 interposed between unit 35 and disk 32, microscope 37 for observing interference fringes on sliding surfaces K and reflecting surface M of slider 6, and camera 38 for photographing the interference fringes.

Using measuring apparatus 31, the flying height of slider 6 is measured as follows.

Figure 5:
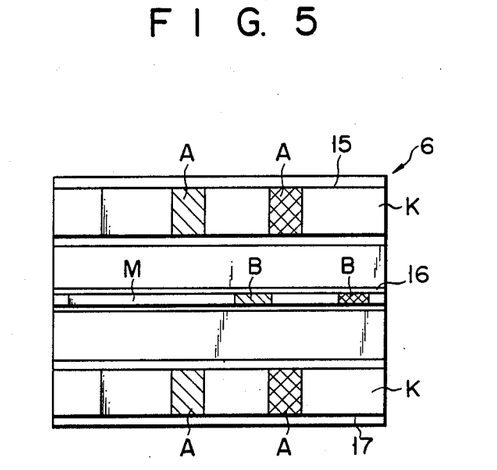
FIGS. 5 and 6 are plan views of the slider bearing thereon interference fringes produced during the measurement of the flying height of the slider on the measuring apparatus shown in FIG. 4.
Figure 7:
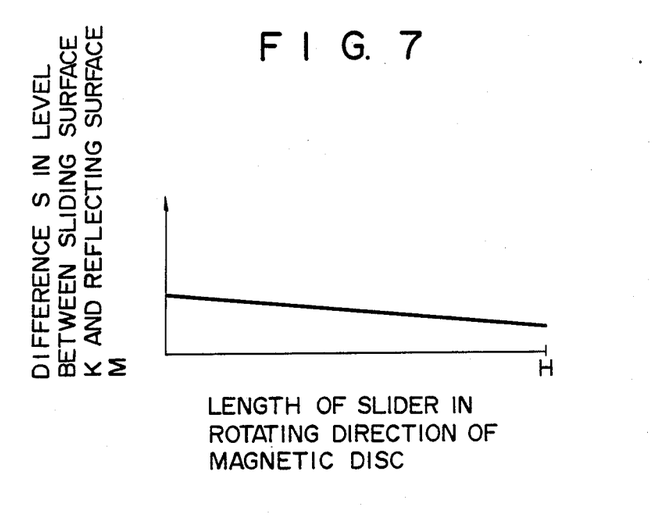
FIGS. 7 and 8 are graphs showing the flying height of the slider measured on the measuring apparatus of FIG. 4.

As shown in FIG. 4, slider 6 supported by suspension mechanism 7 is arranged in measuring apparatus 31 in the same manner as when it is set in an actual magnetic disk apparatus. Measuring magnetic disk 32 is rotated at a speed not lower than a predetermined level. If the minimum flying height of slider 6, i.e., the lift of surface K above disk 1, is 0.1 micrometer or more, the flying height of sliding surfaces K can be measured directly by the optical interference process. When a light beam from light source unit 35 is directed to slider 6, interference fringes A and B are produced on sliding surfaces K and reflecting surface M, respectively, as shown in FIG. 5. Fringes A and B are observed through microscope 37 and photographed by camera 38. The flying height of sliding surfaces K is determined by fringes B on the basis of the optical interference process. The reference flying height of reflecting surface M, i.e., the lift of surface M above magnetic disk 1, is determined by fringes A. As shown in FIG. 7, moreover, minute difference s between the reference flying height of reflecting surface M and the flying height of sliding surfaces K is measured. In FIG. 7, symbol H indicates the position of the tip end of yoke 21 of magnetic head 5.

Figure 6:
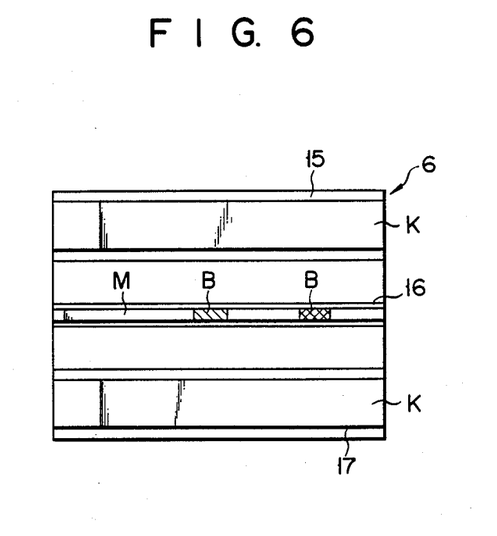
Figure 8:
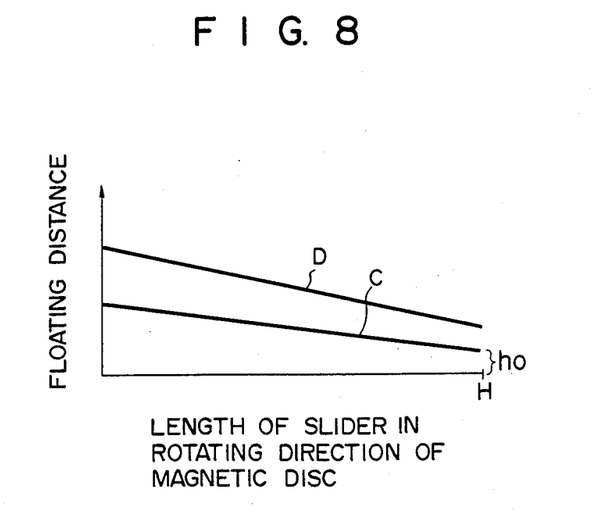

If measuring magnetic disk 32 is rotated at a speed lower than the predetermined level, the flying height of slider 6 is extremely short. If the minimum flying height of slider 6 is shorter than 0.1 micrometer, no interference fringes appear on sliding surfaces K. According to the present invention, however, reflecting surface M has minute differences in level from sliding surfaces K. Therefore, the reference flying height of reflecting surface M is equal to the sum of the flying height of sliding surfaces K and minute difference s, so that interference fringes B appears on surface M, as shown in FIG. 6. The reference flying height is determined by fringes B. Meanwhile, minute difference s is measured in the aforementioned manner. Thus, the flying height of sliding surfaces K is obtained by subtracting difference s from the reference flying height, as shown in FIG. 8. In FIG. 8, symbols C and D indicate the flying height of sliding surfaces K and the reference flying height of reflecting surface M, respectively. The minimum flying height of surfaces K is equivalent to the flying height of magnetic head 5, i.e., the height between the tip end of yoke 21 and magnetic disk 1. Symbol h0 indicates the flying height of head 5. Thus, the flying height of slider 6 can be measured even if the minimum flying height of sliding surfaces K is smaller than 0.1 micrometer.

Figure 9:
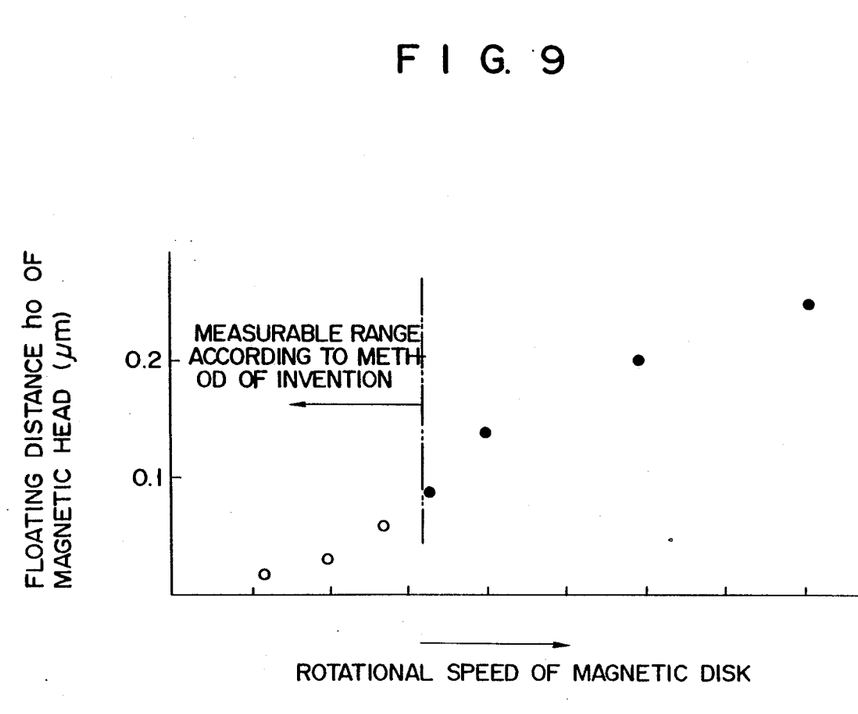
FIG. 9 is a graph showing a range of the flying height of a magnetic head measurable by the method of measurement of the invention.

FIG. 9 shows measurement results of the flying height of magnetic head 5. In FIG. 9, black spots indicate a measurable range according to the prior art method of measurement, while circles indicate that according to the method of the present invention. Thus, according to the invention, the flying height of the magnetic head can be measured to an extremely small value.

Figure 10:
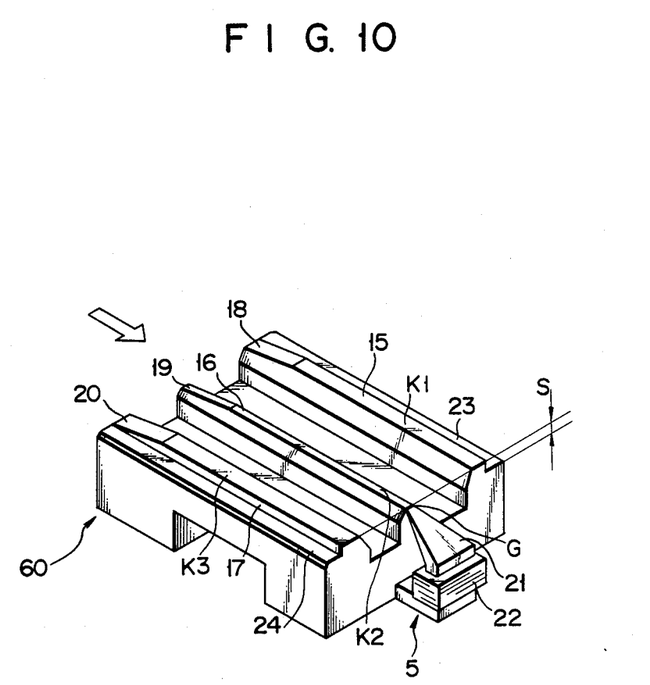
FIG. 10 is a perspective view of a slider of a magnetic disk apparatus according to a second embodiment of the invention.
Figure 11:
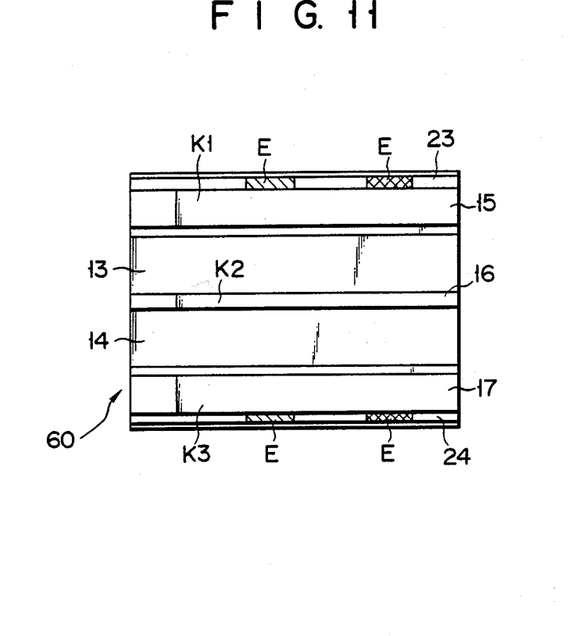
FIG. 11 is a plan view of the slider shown in FIG. 10 bearing thereon interference fringes produced during the measurement.
Figure 12:
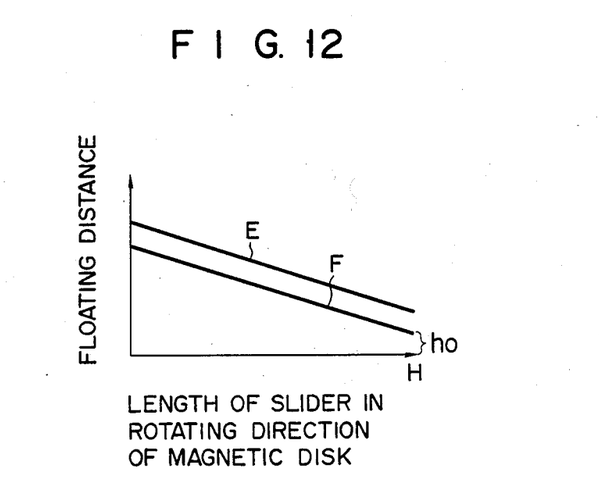
FIG. 12 is a graph showing measurement results of the flying height of the slider obtained through analysis of the interference fringes shown in FIG. 11.
Figure 13:
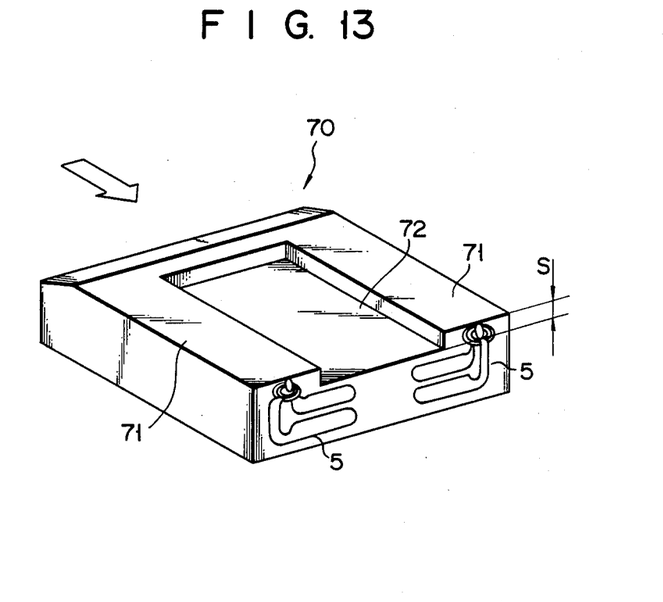
FIG. 13 is a perspective view of a negative-pressure slider of a magnetic disk apparatus according to a third embodiment of the invention.

FIG. 10 shows a second embodiment of the present invention. In this embodiment, three ridges 15, 16 and 17 have respective sliding surfaces K1, K2 and K3 flush with each other. Furthermore, the side ridges 15, and 17 have elongated steppe sections on which reflecting surfaces 23, 24 for measuring flying height are formed, respectively, so as to extend along their corresponding ridges. Surfaces 23 and 24 have minute difference s in level from sliding surfaces K1, K2, and K3. When measuring magnetic disk 32 is rotated to fly slider 60, therefore, interference fringes E appear on reflecting surfaces 23 and 24, as shown in FIG. 11. Like that in the first embodiment, the reference flying height of reflecting surfaces 23 and 24 is determined by fringes E, as shown in FIG. 12. Since minute difference s is a measured value, the flying height of sliding surfaces K1, K2 and K3 of slider 60 is obtained by subtracting difference s from the reference flying height of surfaces 23 and 24. Furthermore, in the embodiment described above, a rolling can be measured.

FIGS. 13 to 16 show a third embodiment of the present invention. According to this embodiment, the invention is applied to a magnetic disk apparatus which includes negative-pressure slider 70. Recess is formed in slider 70 on one side so that the slider 70 has a flat sliding surface 71 and a negative-pressure producing surface 72 which are opposed to the magnetic disk. When disk 1 is rotated, a dynamic lift acts on the sliding surface. On the other hand, surface 72 is subjected to a negative pressure, which acts as a force to depress slider 6. The dynamic lift and negative pressure are balanced with each other, and negative-pressure slider 70 is flied a substantially fixed, minute distance from magnetic disk 1.

Figure 14:
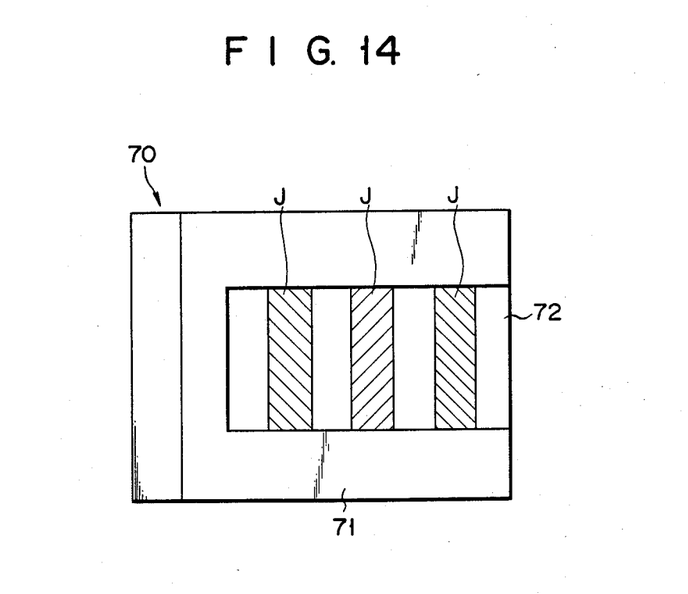
FIG. 14 is a plan view of the slider shown in FIG. 13 bearing thereon interference fringes produced during the measurement.

If the flying height of negative-pressure slider 70 is measured by the optical interference process, interference fringes J appear on specular negative-pressure producing surface 72, as shown in FIG. 14. As in the first and second embodiments, the reference flying height of surface 72 is determined by fringes J. The flying height of sliding surface 71 is obtained by subtracting the depth of depression of surface 72 from the reference flying height of surface 72.

Figure 15:
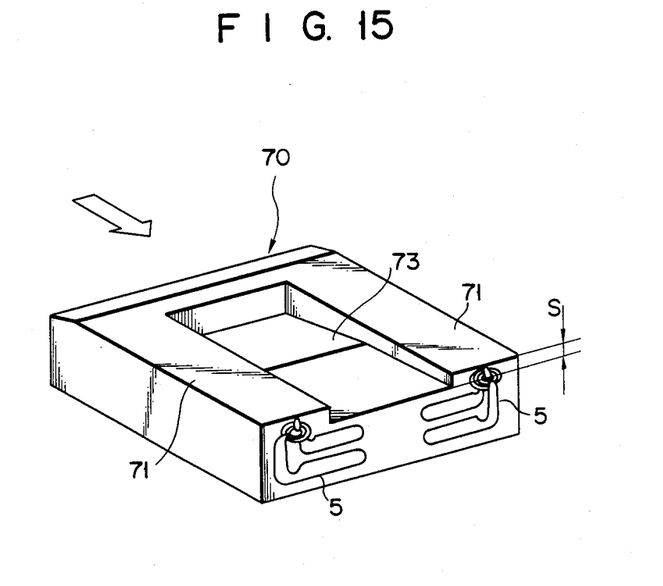
FIG. 15 is a perspective view of an example of a negative-pressure slider of the magnetic disk apparatus of the third embodiment the slider having an inclined negative-pressure producing surface.
Figure 16:
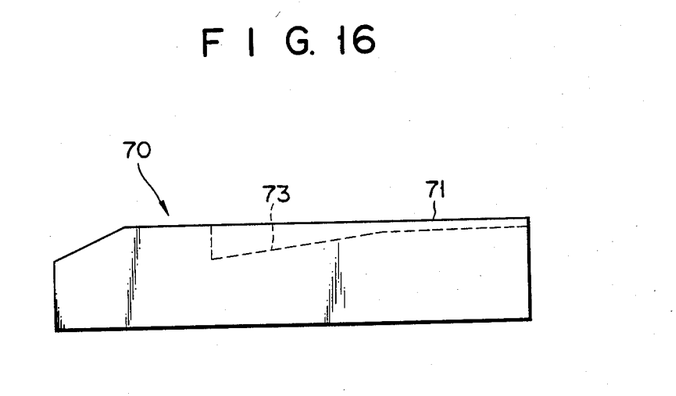
FIG. 16 is a side view of the negative-pressure slider shown in FIG. 15.

Even if negative-pressure producing surface 73 is a slanting surface, as shown in FIGS. 15 and 16, the flying height of sliding surface 71 can be measured by the optical interference process, since surface 73 has a predetermined difference in level from surface 71.

According to the method of measurement of the present invention, the flying height of slider 6 from magnetic disk 1 can be accurately measured by the optical interference process even though its minimum is less than 0.1 micrometer. This can be seen also from the measurement results of FIG. 9.

Thus, it is easy to manufacture magnetic disk apparatuses in which the minimum flying height of the slider is a predetermined value less than 0.1 micrometer.

In general, according to the present invention, a minute flying height between a fixed datum plane and an object flying above the datum plane can be measured accurately.

If the light source used in the measurement by the optical interference process is a white-light source, the maximum of minute difference s is 2 micrometers. When using a unicolor-light source, difference s greater than 2 micrometers can also be measured. Moreover, the magnetic head may be a thin-film head.

What is claimed is:

1. A method of measuring a minute flying height of a magnetic head unit for retrieving information from a rotating magnetic disk, said method comprising steps of:
    preparing a transparent dummy disk which can be rotated to permit air to flow in the circumferential direction thereof, and has a reference plane;
    preparing a slider for said magnetic head unit and locating said slider above said dummy disk, said slider having first and second surfaces which are discrete and non-planar with respect to each other and face the reference plane of said dummy disk, said second surface being located more remotely from the reference plane than said first surface so that said second surface is different in level from said first surface, said first surface being subjected to an air bearing force produced by an air flow when said dummy disk is rotate said second surface being specularly polished to such a degree as to produce interference fringes thereon;
    rotating said dummy disk to permit the air bearing force to be applied to the first surface so that said slider flies away from said dummy disk;
    causing a light beam to pass through said dummy disk such that the light beam falls on the second surface, whereby interference fringes are produced on the second surface due to an optical interference process;
    receiving the light beam having interference fringe information and passed through said dummy disk, and observing the interference fringes on the basis of the optical interference process, so as to determine a reference flying height of the second surface, as measured from the reference plane of said dummy disk; and
    subtracting the difference in level between the first and second surfaces from the reference flying height, thereby obtaining a flying height of the first surface, as measured from the reference plane.

2. A method according to claim 1, wherein said first surface has an upstream end located upstream with reference to the direction of rotation of said disk, and a downstream end located downstream with reference to the direction of rotation of said disk, said magnetic head unit further includes a magnetic head for writing and reading information in and from the magnetic disk, said magnetic head having a yoke with a tip end, the tip end of the yoke being located at the same level as the downstream end of the first surface, said method further comprising steps of:

obtaining a flying height of the downstream end of the first surface, as measured from the reference plane, on the basis of the height of the first surface; and obtaining a flying height of the tip end of the yoke, as measured from the reference plane, on the basis of the flying height of the downstream end of the first surface.

3. A method according to claim 1, wherein said second surface has an upstream end located upstream with reference to the direction of rotation of said disk, and a downstream end located downstream with reference to the direction of rotation of said disk, and said second surface is slanted with reference to the first surface such that a difference in level between the upstream ends of the first and second surfaces is greater than that between the downstream ends of the first and second surfaces.

4. A method according to claim 1, wherein said slider includes a pair of side portions spaced in the radial direction o said disk, and a pair of first ridges formed on the respective side portions and extending in the direction of rotation of said disk, and said first surface is formed on the first ridges.

5. A method according to claim 4, wherein said slider includes a central portion located between the side portions, and a second ridge formed on the central portion, and said second surface is formed on the second ridge.

6. A method according to claim 4, wherein said second surface is formed on the first ridges and adjoins the first surface.

7. A method according to claim 4, wherein the difference in level between the first and second surfaces ranges from 0.1 to 2 micrometers.

8. A method according to claim 4, wherein said slider includes a leading end located upstream with reference to the direction of rotation of said disk, and a cross ridge formed on the leading end and connecting the paired first ridges together, the first ridges and the cross ridge define a recess, and the recess has a negative pressure-producing surface which produces a negative pressure when said disk is rotated, the negative pressure-producing surface having the second surface.

9. A method according to claim 1, wherein said second surface is formed directly on the slider.

10. An apparatus for measuring a minute flying height of a magnetic head unit for retrieving information from a rotating magnetic disk, said apparatus comprising:

a transparent dummy disk which can be rotated to permit air to flow in the circumferential direction thereof, and has a reference plane;

a slider provided in said magnetic head unit, said slider being located above said dummy disk and having first and second surfaces which are discrete and noncoplanar with respect to each other and face the reference plane of said dummy disk, said second surface being located more remotely from the reference plane than said first surface so that the second surface is different in level from the first surface, said first surface being subjected to an air bearing force produced by an air flow when said dummy disk is rotated, said second surface being specularly polished to such a degree as to produce interference fringes thereon;

means for rotating said dummy disk to permit the air bearing force to be applied to the first surface so that said slider flies away from said dummy disk;

a light source for emitting a light beam which passes through said dummy disk and falls on the second surface, so that interference fringes are produced on the second surface due to an optical interference process;

means for receiving the light beam having interference fringe information and passed through said dummy disk, and for observing the interference fringes on the basis of the optical interference process, so as to determine a reference flying height of the second surface, as measured from the reference plane of said dummy disk; and means for subtracting the difference in level between the first and second surfaces from the reference flying height, thereby obtaining a flying height of the first surface, as measured from the reference plane.

11. An apparatus according to claim 10, further comprising a beam splitter for guiding the light beam emitted from the light source to the second surface therethrough, and for guiding the light beam having interference fringe information to said receiving means therethrough.

12. An apparatus according to claim 10, wherein said observing means comprises a camera for photographing the interference fringes.

13. An apparatus according to claim 10, wherein said observing means comprises a microscope for observing the interference fringes.

14. An apparatus according to claim 10, wherein said first surface has an upstream end located upstream with reference to the direction of rotation of said disk, and a downstream end located downstream with reference to the direction of rotation of said disk, said magnetic head unit further includes a magnetic head for writing and reading information in and from the magnetic disk, said magnetic head having a yoke with a tip end, the tip end of the yoke being located at the same level as the downstream end of the first surface, said measuring apparatus further comprises:

means for obtaining a flying height of the downstream end of the first surface, as measured from the reference plane, on the basis of the flying height of the first surface; and means for obtaining a flying height of the tip end of the yoke, as measured from the reference plane, on the basis of the flying height of the downstream end of the first surface.

15. An apparatus according to claim 10, wherein said second surface has an upstream end located upstream with reference to the direction of rotation of said disk, and a downstream end locate downstream with reference to the direction of rotation of said disk, and said second surface is slanted with reference to the first surface such that a difference in level between the upstream ends of the first and second surfaces is greater than that between the downstream ends of the first and second surfaces.

16. An apparatus according to claim 10, wherein
said slider includes a pair of side portions spaced in the radial direction of said disk, and a pair of first ridges formed on the respective side portions and extending in the direction of rotation of said disk, and
said first surface is formed on the first ridges.

17. An apparatus according to claim 16, wherein
said slider includes a central portion located between the side portions, and a second ridge formed on the central portion, and
said second surface is formed on the second ridge.

18. An apparatus according to claim 16, wherein said second surface is formed on the first ridges and adjoins the first surface.

19. An apparatus according to claim 10, wherein the difference in level between the first and second surfaces ranges from 0.1 to 2 micrometers.

20. An apparatus according to claim 16, wherein
said slider includes a leading end located upstream with reference to the direction of rotation of said disk, and a cross ridge formed on the leading end and connecting the paired first ridges together,
said first ridges and a cross ridge define a recess, and
said recess has a negative pressure-producing surface which produces a negative pressure when said disk is rotate the negative pressure-producing surface having the second surface.

21. An apparatus according to claim 10, wherein said second surface is formed directly on the slider.

* * * * *

UNITED STATES PATENT AND TRADEMARK OFFICE
CERTIFICATE OF CORRECTION

PATENT NO. : 4,866,553
DATED : Sep. 12, 1989
INVENTOR(S) : Masahiro Kubo, et al It is certified that error appears in the above-identified patent and that said Letters Patent is hereby corrected as shown below:

The title is incorrectly recorded, "MAGNETIC DISK APPARATUS HAVING A STRUCTURE SUITABLE FOR MEASURING A MINUTE FLYING WEIGHT", should be:

--MAGNETIC DISK APPARATUS HAVING A STRUCTURE SUITABLE FOR MEASURING A MINUTE FLYING HEIGHT--

Signed and Sealed this

Ninth Day of October, 1990

*Attest:*

HARRY F. MANBECK, JR.

*Attesting Officer*     *Commissioner of Patents and Trademarks*